(12) United States Patent
Bhattacharyya et al.

(10) Patent No.: US 9,565,248 B2
(45) Date of Patent: Feb. 7, 2017

(54) ASSIGNING USER WORKLOADS TO APPLICATION SERVERS

(71) Applicant: INTERNATIONAL BUSINESS MACHINES CORPORATION, Armonk, NY (US)

(72) Inventors: Anamitra Bhattacharyya, Chelmsford, MA (US); Krishnamohan Dantam, Chelmsford, MA (US); Ravi Kosaraju, Pittsford, NY (US); Manjunath D. Makonahalli, Acton, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/836,532

(22) Filed: Aug. 26, 2015

(65) Prior Publication Data

US 2016/0094639 A1 Mar. 31, 2016

Related U.S. Application Data

(63) Continuation of application No. 14/498,700, filed on Sep. 26, 2014, now Pat. No. 9,253,253.

(51) Int. Cl.
*H04L 29/06* (2006.01)
*H04L 29/08* (2006.01)
*G06F 9/50* (2006.01)
*G06F 21/31* (2013.01)

(52) U.S. Cl.
CPC ......... *H04L 67/1008* (2013.01); *G06F 9/5027* (2013.01); *G06F 21/31* (2013.01); *H04L 63/0884* (2013.01); *H04L 63/0892* (2013.01)

(58) Field of Classification Search
CPC ............ H04L 67/1008; H04L 63/0884; H04L 63/0892; G04F 9/505; G04F 9/5061; G04F 9/5072
See application file for complete search history.

(56) References Cited

U.S. PATENT DOCUMENTS 6,735,769 B1   5/2004   Brenner et al.
6,782,410 B1 * 8/2004   Bhagat .................. G06F 9/5027
                                                    709/201

(Continued)

FOREIGN PATENT DOCUMENTS

WO    2007071286    6/2007

OTHER PUBLICATIONS

Ping-Ho Ting et al., "Development of Users Distribution in Enterprise Systems with limited Buffer Size in Application Servers", Proceedings of 6th Industrial Conference on Data Mining, Posters, pp. 172-186, Leipzip, Germany, Jul. 14-15, 2006.

(Continued)

*Primary Examiner* — Carl Colin
*Assistant Examiner* — Gary Lavelle
(74) *Attorney, Agent, or Firm* — Michael R. Long; Richard Wilhelm

(57) ABSTRACT

A technique for assigning a user workload to an application server includes receiving a user request to initiate execution of a workload assigned to a user. An application server is selected, from among multiple application servers, to execute the workload based on compatibility between respective current states of the application servers and the workload.

6 Claims, 7 Drawing Sheets

(56) References Cited

U.S. PATENT DOCUMENTS

| | | | |
|---|---|---|---|
| 8,316,122 B2* | 11/2012 | Binyamin | H04L 67/16 |
| | | | 709/203 |
| 8,676,994 B2 | 3/2014 | Manapragada et al. | |
| 8,732,291 B2 | 5/2014 | Zhu et al. | |
| 9,098,342 B2 | 8/2015 | Jiang et al. | |
| 2005/0108714 A1 | 5/2005 | Geye et al. | |
| 2005/0210472 A1 | 9/2005 | Accapadi et al. | |
| 2006/0224741 A1 | 10/2006 | Jackson | |
| 2008/0046895 A1 | 2/2008 | Dillenberger et al. | |
| 2010/0242092 A1* | 9/2010 | Harris | H04L 63/08 |
| | | | 726/3 |
| 2013/0081047 A1 | 3/2013 | Frey et al. | |
| 2013/0185433 A1 | 7/2013 | Zhu et al. | |
| 2014/0372550 A1* | 12/2014 | Said | H04L 67/1008 |
| | | | 709/213 |

OTHER PUBLICATIONS

Bhattacharyya et al. "Techniques for Assigning User Workloads to Application Servers", U.S. Appl. No. 14/498,700, filed Sep. 26, 2014. Notice of Allowance dated Sep. 30, 2015.

* cited by examiner

User1 Cache Hit Test Package

| Workload | Due Date (Priority) | Cache Lookup key | Cache Type | Status |
|---|---|---|---|---|
| Task1 | 1 | E, UID1 | au, d, m, t, ap, as | NA |
| Task2 | 3 | E, UID1 | au, ap, as | NA |
| Task3 | 5 | E, UID1 | d, m | NA |
| Task4 | 2 | E, UID1 | ap, as | NA |
| Task5 | 4 | E, UID1 | au, m, ap | NA |

User2 Cache Hit Test Package 600

| Workload | Due Date (Priority) | Cache Lookup key | Cache Type | Status |
|---|---|---|---|---|
| Task6 | 5 | F, UID2 | au, d, m, t, ap, as | NA |
| Task7 | 2 | F, UID2 | au, t, as | A |
| Task8 | 1 | F, UID2 | d, m, t | A |
| Task9 | 4 | F, UID2 | t, ap, as | NA |
| Task10 | 3 | F, UID2 | au, m, t, | NA |

ASSIGNING USER WORKLOADS TO APPLICATION SERVERS

This application is a continuation of U.S. patent application Ser. No. 14/498,700, entitled "TECHNIQUES FOR ASSIGNING USER WORKLOADS TO APPLICATION SERVERS," and filed on Sep. 26, 2014. U.S. patent application Ser. No. 14/498,700 is hereby incorporated herein by reference in its entirety for all purposes.

BACKGROUND

The present disclosure is generally directed to techniques for assigning workloads and, more specifically, to techniques for assigning user workloads to application servers.

In general, cloud computing refers to Internet-based computing where shared resources, software, and information are provided to users of computer systems and other electronic devices (e.g., mobile phones) on demand, similar to the electricity grid. Adoption of cloud computing has been aided by the widespread utilization of virtualization, which is the creation of a virtual (rather than actual) version of something, e.g., an operating system, a server, a storage device, network resources, etc. A virtual machine (VM) is a software implementation of a physical machine (PM), e.g., a computer system, that executes instructions like a PM. VMs are usually categorized as system VMs or process VMs. A system VM provides a complete system platform that supports the execution of a complete operating system (OS). In contrast, a process VM is usually designed to run a single program and support a single process. A VM characteristic is that application software running on the VM is limited to the resources and abstractions provided by the VM. System VMs (also referred to as hardware VMs) allow the sharing of the underlying PM resources between different VMs, each of which executes its own OS. The software that provides the virtualization and controls the VMs is typically referred to as a VM monitor (VMM) or hypervisor. A hypervisor may run on bare hardware (Type 1 or native VMM) or on top of an operating system (Type 2 or hosted VMM).

Cloud computing provides a consumption and delivery model for information technology (IT) services based on the Internet and involves over-the-Internet provisioning of dynamically scalable and usually virtualized resources. Cloud computing is facilitated by ease-of-access to remote computing websites (e.g., via the Internet or a private corporate network) and frequently takes the form of web-based tools or applications that a cloud consumer can access and use through a web browser, as if the tools or applications were a local program installed on a computer system of the cloud consumer. Commercial cloud implementations are generally expected to meet quality of service (QoS) requirements of consumers and typically include service level agreements (SLAs). Cloud consumers avoid capital expenditures by renting usage from a cloud vendor (i.e., a third-party provider). In a typical cloud implementation, cloud consumers consume resources as a service and pay only for resources used.

Enterprise software is purposed-designed computer software that is implemented to satisfy the needs of an organization, as contrasted with the needs of individual users. An organization may take the form of a business, a school, an interest-based user group or a club, a retailer, or a government, etc. Today, enterprise software is an integral part of information systems. Services provided by enterprise software are typically business-oriented tools, e.g., online shopping and online payment processing, interactive product catalogs, automated billing systems, security, enterprise content management, information technology (IT) service management, customer relationship management, enterprise resource planning, business intelligence, project management, collaboration, human resource management, manufacturing, enterprise application integration, and enterprise forms automation. As enterprises have similar departments and systems in common, enterprise software is often available as a suite of customizable programs. Generally, the complexity of these tools requires specialist capabilities and specific knowledge.

The term 'enterprise software' may be used to describe a collection of computer programs with common business applications, modeling tools for modeling how an entire organization works, and development tools for building applications unique to an organization. Enterprise software is intended to address an enterprise-wide problem, as contrasted with a departmental problem. Enterprise application software aims to improve productivity and efficiency of an organization by providing business logic support functionality. Enterprise application software may be utilized to perform business functions such as order processing, procurement, production scheduling, customer information management, energy management, and accounting. Enterprise applications are usually hosted on servers and provide simultaneous services to a large number of users, typically over a computer network. Enterprise software can be categorized by business function. Enterprise management categories include: accounting software, business intelligence, business process management, content management, customer relationship management, database, enterprise resource planning, and enterprise asset management.

BRIEF SUMMARY

Disclosed are a method, a data processing system, and a computer program product (embodied in a computer-readable storage device) for assigning user workloads to application servers.

A technique for assigning a user workload to an application server includes receiving a user request to initiate execution of a workload assigned to a user. An application server is selected, from among multiple application servers, to execute the workload based on compatibility between respective current states of the application servers and the workload.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein:

FIG. 5 is a data structure (e.g., a table) that depicts an exemplary cache hit test package (CHTP), according to various embodiments of the present disclosure;

FIG. 6 is another table depicting another exemplary CHTP, according to various embodiments of the present disclosure.

DETAILED DESCRIPTION

Figure 1:
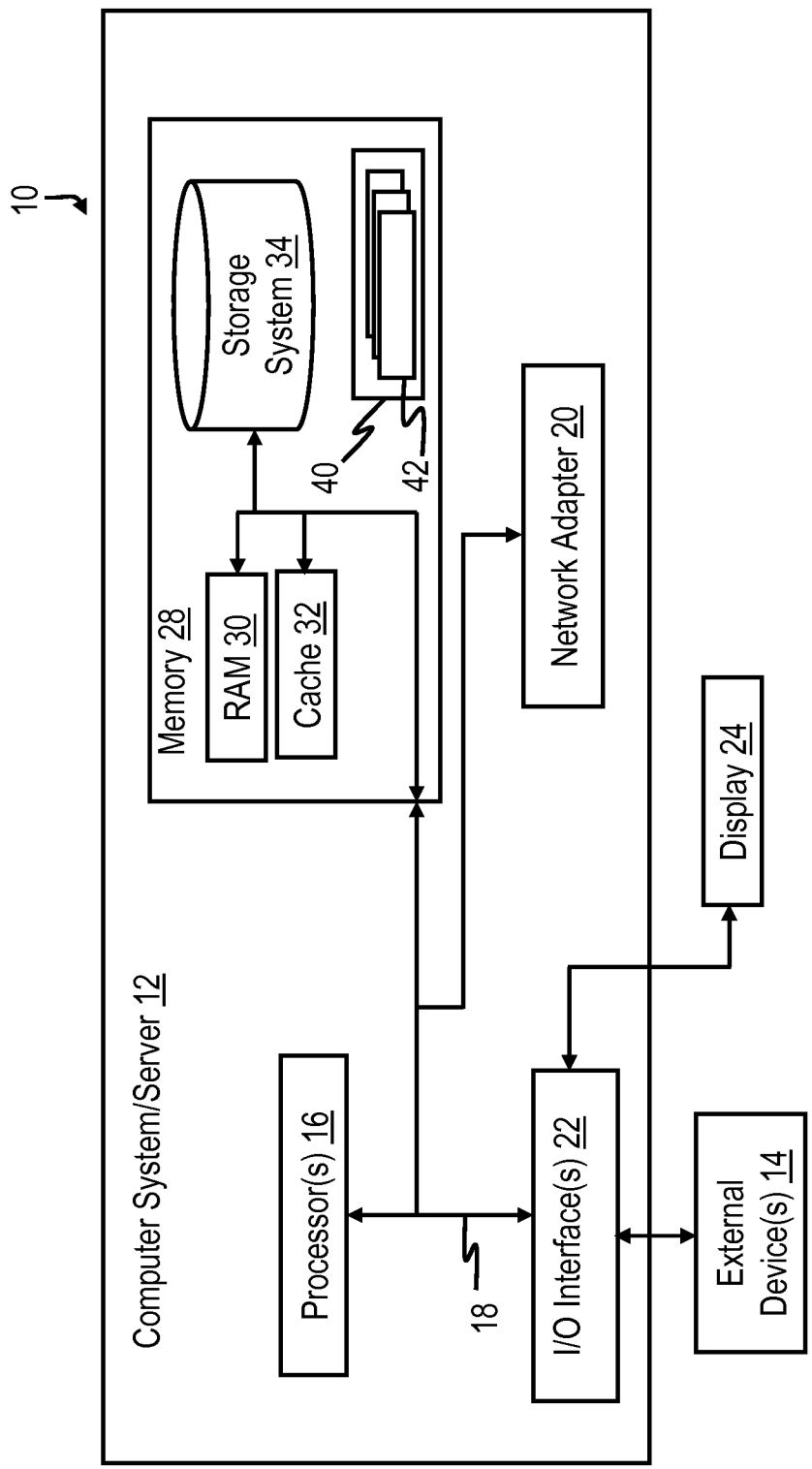
FIG. 1 depicts a relevant portion of an exemplary cloud computing node that is configured according to an embodiment of the present disclosure.

The illustrative embodiments provide a method, a data processing system, and a computer program product (embodied in a computer-readable storage device) for assigning user workloads to application servers.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

It should be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Cloud characteristics may include: on-demand self-service; broad network access; resource pooling; rapid elasticity; and measured service. Cloud service models may include: software as a service (SaaS); platform as a service (PaaS); and infrastructure as a service (IaaS). Cloud deployment models may include: private cloud; community cloud; public cloud; and hybrid cloud.

On-demand self-service means a cloud consumer can unilaterally provision computing capabilities, such as server time and network storage, as needed automatically without requiring human interaction with a service provider. Broad network access means capabilities are available over a network and accessed through standard mechanisms that promote use by heterogeneous thin or thick client platforms (e.g., mobile phones, laptops, and personal digital assistants (PDAs)). Resource pooling means computing resources of a provider are pooled to serve multiple consumers using a multi-tenant model, with different physical and virtual resources dynamically assigned and reassigned according to demand. In resource pooling there is a sense of location independence in that the consumer generally has no control or knowledge over the exact location of the provided resources but may be able to specify location at a higher level of abstraction (e.g., country, state, or datacenter).

Rapid elasticity means capabilities can be rapidly and elastically provisioned, in some cases automatically, to quickly scale-out and be rapidly released to quickly scale-in. To the consumer, the capabilities available for provisioning often appear to be unlimited and can be purchased in any quantity at any time. Measured service means cloud systems automatically control and optimize resource use by leveraging a metering capability at some level of abstraction that is appropriate to the type of service (e.g., storage, processing, bandwidth, and active user accounts). Resource usage can be monitored, controlled, and reported providing transparency for both the provider and consumer of the utilized service.

In an SaaS model the capability provided to the consumer is to use applications of a provider that are running on a cloud infrastructure. The applications are accessible from various client devices through a thin client interface such as a web browser (e.g., web-based e-mail). In the SaaS model, the consumer does not manage or control the underlying cloud infrastructure (including networks, servers, operating systems, storage, or even individual application capabilities), with the possible exception of limited user-specific application configuration settings.

In a PaaS model a cloud consumer can deploy consumer-created or acquired applications (created using programming languages and tools supported by the provider) onto the cloud infrastructure. In the PaaS model, the consumer does not manage or control the underlying cloud infrastructure (including networks, servers, operating systems, or storage), but has control over deployed applications and possibly application hosting environment configurations.

In an IaaS service model a cloud consumer can provision processing, storage, networks, and other fundamental computing resources where the consumer is able to deploy and run arbitrary software (which can include operating systems and applications). In the IaaS model, the consumer does not manage or control the underlying cloud infrastructure but has control over operating systems, storage, deployed applications, and possibly limited control of select networking components (e.g., host firewalls).

In a private cloud deployment model the cloud infrastructure is operated solely for an organization. The cloud infrastructure may be managed by the organization or a third party and may exist on-premises or off-premises. In a community cloud deployment model the cloud infrastructure is shared by several organizations and supports a specific community that has shared concerns (e.g., mission, security requirements, policy, and compliance considerations). The cloud infrastructure may be managed by the organizations or a third party and may exist on-premises or off-premises. In a public cloud deployment model the cloud infrastructure is made available to the general public or a large industry group and is owned by an organization selling cloud services.

In a hybrid cloud deployment model the cloud infrastructure is a composition of two or more clouds (private, community, or public) that remain unique entities but are bound together by standardized or proprietary technology that enables data and application portability (e.g., cloud bursting for load-balancing between clouds). In general, a cloud computing environment is service oriented with a focus on statelessness, low coupling, modularity, and semantic interoperability. At the heart of cloud computing is an infrastructure that includes a network of interconnected nodes.

With reference to FIG. 1, a schematic of an exemplary cloud computing node 10 is shown. Cloud computing node 10 is only one example of a suitable cloud computing node and is not intended to suggest any limitation as to the scope of use or functionality of embodiments described herein. Regardless, cloud computing node 10 is capable of being implemented and/or performing any of the functionality set forth herein. Cloud computing node 10 includes a computer system/server (or more generally a data processing system) 12, which is operational with numerous other general purpose or special purpose computing system environments or configurations. Examples of well-known computing systems, environments, and/or configurations that may be suitable for use with computer system/server 12 include, but are not limited to, personal computer (PC) systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 (in cloud computing node 10) is illustrated in the form of a general-purpose computing device. The components of computer system/server 12 may include, but are not limited to, one or more processors or processing units (including one or more processor cores) 16, a system memory 28, and a bus 18 that couples various system components (including system memory 28) to processors 16. Bus 18 represents one or more of any of several types of bus structures, including a memory bus or memory controller bus, a peripheral bus, an accelerated graphics port, and a processor or local bus using any of a variety of bus architectures. By way of example, and not limitation, such architectures include the industry standard architecture (ISA) bus, the micro channel architecture (MCA) bus, the enhanced ISA (EISA) bus, the video electronics standards association (VESA) local bus, and the peripheral components interconnect (PCI) bus.

Computer system/server 12 typically includes a variety of computer system readable media. Such media may be any available media that is accessible by computer system/server 12, and includes both volatile and non-volatile media, removable and non-removable media. System memory 28 can include computer system readable media in the form of volatile memory, such as random access memory (RAM) 30 and/or cache memory 32.

Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, nonvolatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces.

As will be further depicted and described herein, memory 28 may include at least one program product having a set (e.g., at least one) of program modules that are configured to carry out the functions of various disclosed embodiments. Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, one or more other devices that enable a user to interact with computer system/server 12, and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components can be used in conjunction with computer system/server 12. Examples, include, but are not limited to: microcode, device drivers, redundant processing units, external disk drive arrays, redundant array of inexpensive disk (RAID) systems, tape drives, and data archival storage systems, etc.

Figure 2:
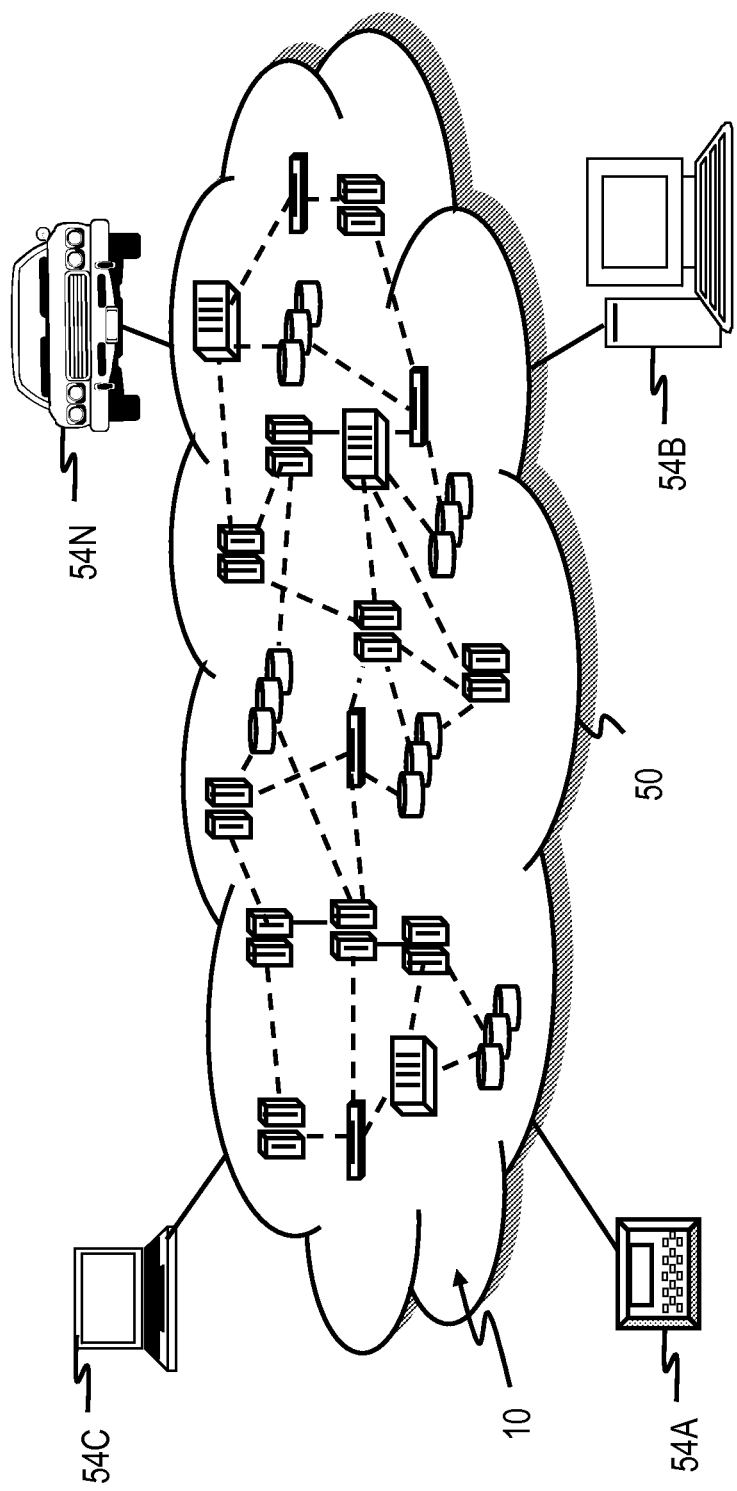
FIG. 2 depicts a relevant portion of an exemplary cloud computing environment that is configured according to an embodiment of the present disclosure.

With reference to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone MA, desktop computer MB, laptop computer MC, and/or automobile computer system MN, may communicate. Nodes 10 may communicate with one another and may be grouped (not shown) physically or virtually, in one or more networks, such as private, community, public, or hybrid clouds as described herein, or a combination thereof. In this manner, cloud computing environment 50 can offer infrastructure, platforms and/or software as services for which a cloud consumer does not need to maintain resources on a local computing device. It should be understood that the types of computing devices MA-N shown in FIG. 2 are intended to be illustrative only and that computing nodes 10 and cloud computing environment 50 can communicate with any type of computerized device over any type of network and/or network addressable connection (e.g., using a web browser).

Figure 3:
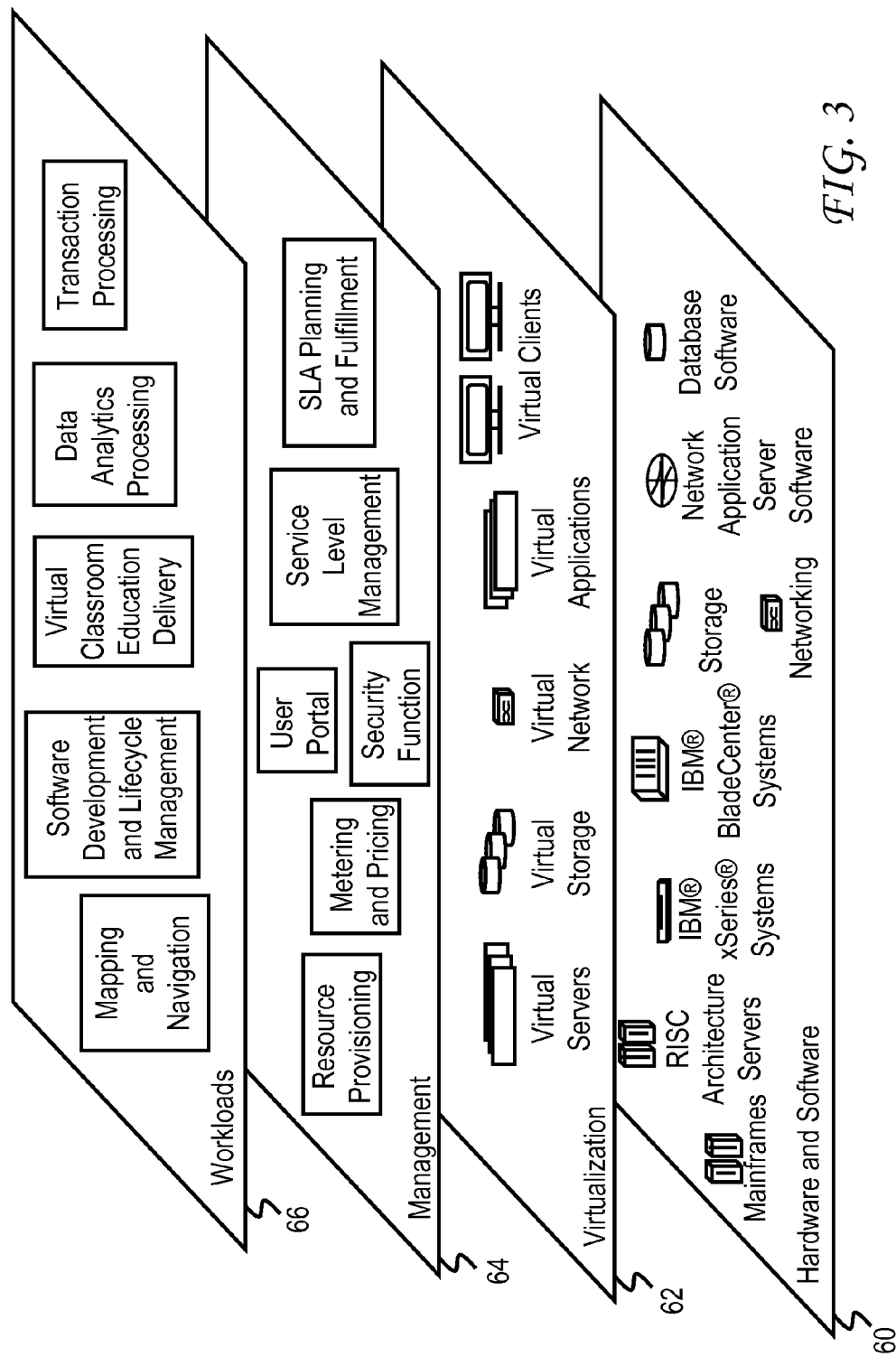
FIG. 3 depicts exemplary abstraction model layers of a cloud computing environment configured according to an embodiment of the present disclosure.

With reference to FIG. 3, a set of functional abstraction layers provided by cloud computing environment 50 (FIG. 2) is shown. It should be understood that the components, layers, and functions shown in FIG. 3 are intended to be illustrative only and embodiments of the invention are not limited thereto. As depicted in FIG. 3, cloud computing environment 50 includes a hardware and software layer 60, a virtualization layer 62, a management layer 64, and a workloads layer 66.

Hardware and software layer 60 includes various hardware and software components. As one example, the hardware components may include mainframes (e.g., IBM® zSeries® systems), reduced instruction set computer (RISC) architecture based servers (e.g., IBM® pSeries® systems), IBM® xSeries® systems, IBM® BladeCenter® systems, storage devices, networks and networking components. As another example, the software components may include network application server software (e.g., IBM® WebSphere® application server software) and database software (e.g., IBM® DB2® database software). IBM, zSeries, pSeries, xSeries, BladeCenter, WebSphere, and DB2 are trademarks of International Business Machines Corporation registered in many jurisdictions worldwide.

Virtualization layer 62 provides an abstraction layer in which virtual entities (e.g., virtual servers, virtual storage, virtual networks (including virtual private networks), virtual applications and operating systems, and virtual clients are included. As previously discussed, these virtual entities may be accessed by clients of cloud computing environment 50 on-demand. The virtual entities are controlled by one or more virtual machine monitors (VMMs) that may, for example, be implemented in hardware and software layer 60, virtualization layer 62, or management layer 64.

Management layer 64 provides various functions (e.g., resource provisioning, metering and pricing, security, user portal, service level management, and SLA planning and fulfillment). The resource provisioning function provides dynamic procurement of computing resources and other resources that are utilized to perform tasks within the cloud computing environment. For example, the resource provisioning function may be performed for virtual machines (VMs) by one or more VMMs. The metering and pricing function provides cost tracking (as resources are utilized within the cloud computing environment) and billing or invoicing for consumption of the utilized resources. As one example, the utilized resources may include application software licenses.

The security function provides identity verification for cloud consumers and tasks, as well as protection for data and other resources. The user portal function provides access to the cloud computing environment for consumers and system administrators. The service level management function provides cloud computing resource allocation and management such that required service levels are met. For example, the security function or service level management function may be configured to limit deployment/migration of a virtual machine (VM) image to geographical location indicated to be acceptable to a cloud consumer. The service level agreement (SLA) planning and fulfillment function provides pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; and transaction processing.

In enterprise application software (e.g., work and service management applications, where users are assigned work via an inbox), an application server to which a user is assigned may have significant impact on user response time and overall performance due to a state of the application server. As used herein, the term 'application server state' or 'state of an application server' means what applications an application server is executing and what data associated with the executed applications the application server is currently maintaining in server-associated storage. For example, a state of an application server may be defined by in-memory metadata, application data, as well as system resources (i.e., what system resources a given user has authorization to access, as loaded by, for example, a management application). For example, a state of an application server may include user authorizations, application data, translated data, etc. In general, a state of an application may be thought of as the tasks (e.g., receiving input into a specific form) that are currently being accomplished by the application.

Increasingly, enterprise application software is deployed in a cloud environment and delivered in the form of Software as a Service (SaaS). In general, data processing systems deployed in a cloud environment are required to handle higher user loads than traditional data processing systems. In cloud deployments, in-memory caching for an application generally improves the performance of large systems. When a user is attempting to access an application whose state is not yet maintained in a memory of the application server, the application server has to spend additional resources to load state associated information of the application into memory. If the user accesses application data that was previously loaded by an application server, then the user is provided with relatively fast access to an associated application. In conventional load balancers, neither an application server state nor a user context (e.g., what applications and application data a user needs to execute an assigned workload) has been available and, as such, conventional load balancers have not been able to utilize an application server state and/or a user context when making load balancing decisions.

According to one or more embodiments of the present disclosure, predictions as to which applications and data users will access is attempted, and the user is assigned to an application server that allows the user to complete tasks in a relatively efficient manner. For example, when application data may be shared across multiple users it may be more efficient to assign users that share application data to a same application server. In general, application usage and data access by a user may be predicted, and a user may be assigned to an application server that provides optimal or near optimal access to desired applications and associated data. In various embodiments, an affinity score is calculated for each application server based on inbox assignments (e.g., provided by a work management system) for a user. According to one or more embodiments of the present disclosure, a load balancer selects a primary application server and a secondary application server (for session replication) based on the affinity scores of available application servers. The disclosed techniques may advantageously improve user response times (due to increased in-memory access), reduce application server resource usage (due to reduced redundant loading of data into memory), and improve database performance (due to reduced data requests by application servers).

According to at least one embodiment of the present disclosure, a user assignment analyzer is configured to: identify user assignments; and prioritize a list of assignments using, for example, a cache type and an assigned priority (e.g., in the form of a due date). In one or more embodiments, for each entry in an assignment list, cache lookup keys and cache types are identified, and the cache types, cache lookup keys, priority, and status (e.g., assigned or not assigned) are packaged into a cache hit test package and then transmitted to an affinity provider. The cache hit test package may be pre-calculated for frequent users (based on work in an inbox of a user) and updated regularly.

According to one embodiment of the present disclosure, each application server is configured to determine what information (designated in a cache hit test package (CHTP)) is cached in memory of the application server. That is, for each entry in a CHTP, each application server checks an associated cache for an associated cache type based on the cache lookup key. For example, a cache lookup key may indicate a language (e.g., French (F), English (E), or German (G)) for a cache type. As another example, a cache lookup key may indicate a user ID (UID) or username. For each cache hit, an application server assigns a hit score (e.g., fixed by cache type) for the entry. For example, 'cache types' may include: authorization (au), description (d), metadata (m), translated (t), application (ap), and asset (as) 'cache types'. As one example, a cache lookup key that includes a user ID may be used to determine whether authorization data for the UID is already available at an application server. As another example, a cache lookup key that specifies a language may be used to determine whether translation data for the language is already available at an application server. As yet another example, a cache lookup key that specifies a language may also be used to determine whether metadata for the language is already available at an application server.

In general, respective cache lookup keys may be used to determine whether any specific cache types are already available at a given application server for a given application. Broadly, cache lookup keys and cache types specified in a cache hit test package allow an application server to determine whether the application server already has a desired application and associated information, loaded in memory, to execute an assigned workload of a given user. While the term 'cache type' is utilized herein, it should be appreciated that type information may be stored in any type of memory associated with an application server. In one or more embodiments, an application server may be configured to combine scores for each entry and may multiply the scores by a weight that is based on, for example, cache type and/or priority (e.g., due date). As one example, a translation type may be weighted more than an asset type. As another example, higher priority entries may be weighted more than lower priority entries. As yet another example, entries with due dates that are nearer may be weighted more than due dates that are farther in the future. In at least one embodiment, an application server adds all of the entry scores to derive an affinity score that is returned to an affinity provider (assumes that all tasks in a user inbox will all be performed on a same application server). Alternatively, tasks in a given user inbox may be assigned to different application servers and, in this case, each user inbox entry will have its own separate affinity score.

According to one or more embodiments of the present disclosure, an affinity provider is configured to transmit a UID to a user assignment analyzer, retrieve a CHTP for the user from the user assignment analyzer, and transmit the CHTP to available application servers. In one or more embodiments, an affinity provider is configured to sort responding application servers by affinity score (e.g., from one to ten, with ten being the best score) and then pass the affinity scores to a load balancer. According to one or more embodiments of the present disclosure, a load balancer is configured to determine primary and secondary candidate application servers based on the affinity scores returned by the application servers (and possibly other distribution factors). For example, the other distribution factors may include: a current load on available application servers; a location (Canada, United States, Germany, Austria, Switzerland, Italy, Slovenia, Croatia, Europe, North America, Texas, Missouri, Mich., etc.) of available application servers; a capacity of available application servers; and a configuration of the application servers. When the other distribution factors are employed, a load balancer may weight the affinity scores based on the other distribution factors when selecting primary and secondary application servers to execute a workload assigned to a user.

According to one or more embodiments, a user assignment process flow is initiated when a user request (e.g., a login request) is received at a load balancer, which transmits the user request to an affinity provider when the user request is unassigned. In one or more embodiments, a user request from an authenticated and assigned user is transmitted directly to an assigned application server. The affinity provider transmits requests from unauthenticated users to an authenticator. On successful authentication, the affinity provider forwards a user identifier (ID) to a user assignment analyzer. In one embodiment, the user assignment analyzer transmits a previously generated CHTP (based on workloads assigned to a user in an inbox of the user) to the affinity provider. Alternatively, the user assignment analyzer may generate the CHTP on demand. In one or more embodiments, the user assignment analyzer monitors user inboxes and updates associated CHTPs for the users based on current workload assignments in each user inbox. In at least one embodiment, upon receipt, the affinity provider broadcasts a CHTP to available application servers. Each of the application servers then calculates an affinity score for the user CHTP based on an associated state of a given application server. In one embodiment, the affinity provider collects affinity scores from each of the application servers, e.g., within a threshold wait time, and then forwards the received affinity scores to the load balancer. In this embodiment, the load balancer then determines primary and secondary application servers for the user request and transmits the user request to the primary application server.

The disclosed techniques attempt to optimize server allocation based on user profiles, namely workloads assigned to a user based on analyzing an inbox of a user. In general, conventional approaches have not: attempted to optimize cache hits during assignment of users to application servers; attempted to improve user response time; taken application caching into account; and/or examined user inboxes to estimate cache hits. The disclosed techniques increase throughput by identifying an application server that should be optimal for a current workload (assigned to a user via an inbox of a user) of the user.

Figure 4:
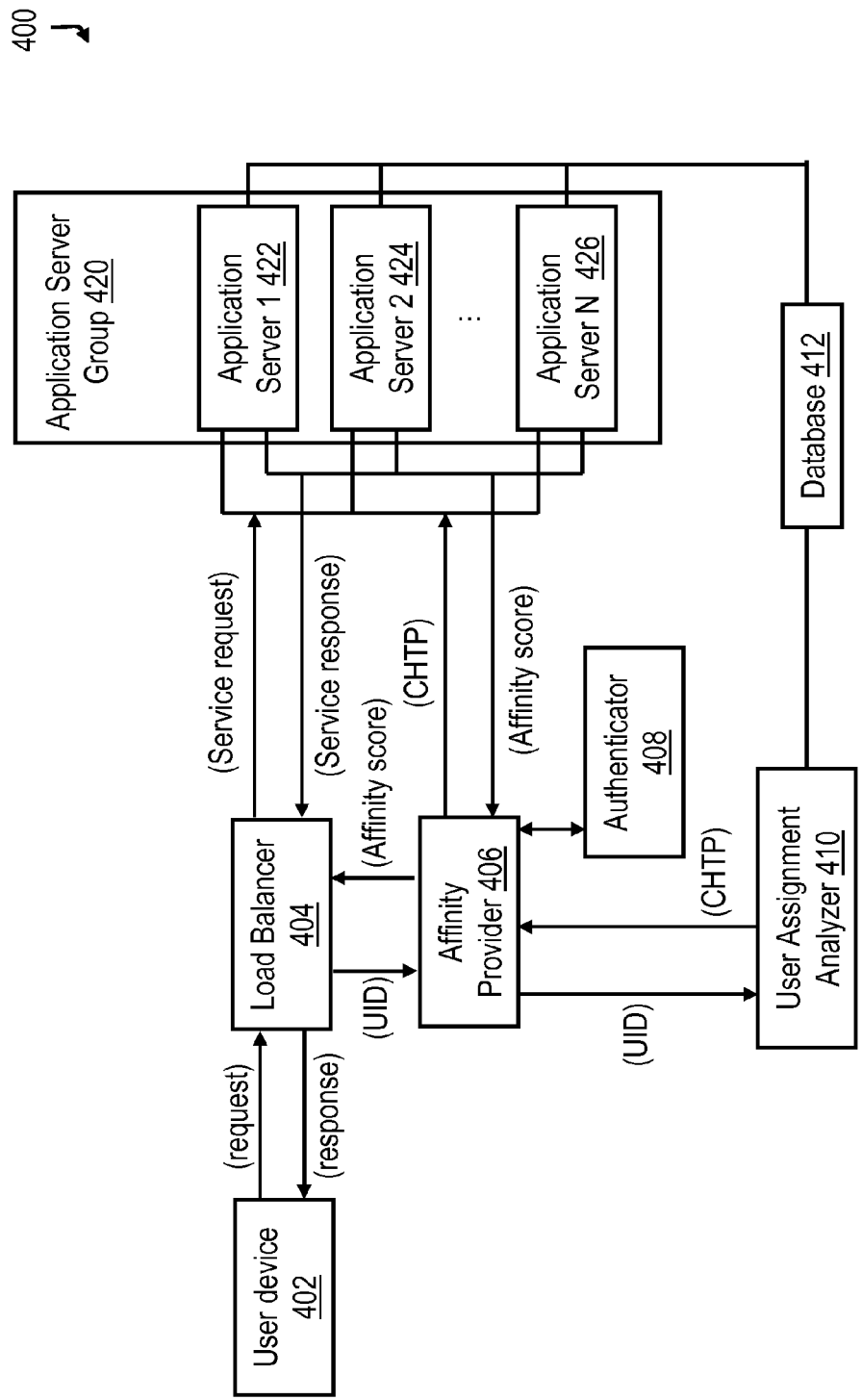
FIG. 4 is a diagram of a system configuration for assigning user workloads to application servers, according to an embodiment of the present disclosure.

With reference to FIG. 4, a system 400 is illustrated that includes a plurality of application servers 422, 424, and 426 that are included in an application server group 420, which may correspond to one or more cloud computing nodes 10 in cloud computing environment 50. As is illustrated, a load balancer 404 is configured to receive a user request (which may correspond to, for example, a login request) from a user device 402. According to at least one embodiment, a user assignment analyzer 410 is configured to regularly analyze inboxes of various users (by accessing database 412) and to create or update a CHTP for each of the users. Application server 422, 424, and 426 may also access database 412 to retrieve information or to update database 412. As previously mentioned, a CHTP may include cache lookup keys and cache types for each entry (as reflected in a user inbox) in an assignment list of a user. Load balancer 404 is configured to transmit a service request, responsive to the user request, to an assigned application server 422, 424, or 426, when a user associated with the user request is authenticated and the user request is assigned. Load balancer 404 is also configured to transmit a user ID (UID) of a user to an affinity provider 406, when a user request is unassigned.

Affinity provider 406 transmits a UID associated with a user request from an unauthenticated user to an authenticator 408. On successful authentication, affinity provider 406 transmits the UID to user assignment analyzer 410. In one embodiment, user assignment analyzer 410 transmits a previously generated CHTP (based on workloads assigned to a user in an inbox of the user) to affinity provider 406. As noted above, alternatively, user assignment analyzer 410 may generate a CHTP on demand. Upon receipt, affinity provider 406 broadcasts the CHTP to available application servers 422, 424, and 426. Application servers 422, 424, and 426 then calculate respective affinity scores for the CHTP based on an associated state. In one embodiment, affinity provider 406 then collects, e.g., within a threshold wait time, affinity scores from each of application servers 422, 424, and 426 and transmits the received affinity scores to load balancer 404. Load balancer 404 then determines (based on the affinity scores) primary and secondary application servers for the user request and transmits a service request to the primary application server (i.e., one of application servers 422, 424, and 426) for servicing (i.e., initiation of workload execution). A selected one of application servers 422, 424, and 426 provides a service response (e.g., 'assignment accepted' or 'assignment rejected') to load balancer 404.

Load balancer 404, affinity provide 406, authenticator 408, and user assignment analyzer 410 may execute on one or more data processing systems included in cloud computing node 10.

With reference to FIG. 5, an exemplary cache hit test package (CHTP) 500, which is configured according to an embodiment of the present disclosure, is depicted for a first user (UID1). CHTP 500, as illustrated, includes: workloads (e.g., Task1, Task2, Task3, Task4, and Task5) for the first user (User1); a due date or priority, one or more cache lookup keys (e.g., including a language designator and a UID), one or more cache types (e.g., authorization (au), description (d), metadata (m), translated (t), application (ap), and asset (as) cache types); and a status (e.g., not assigned (NA) or assigned (A)). In CHTP 500, the cache lookup key 'E' indicates the language is English, and the cache lookup key 'UID1' indicates an identifier or username for a first user. As is illustrated, a first task (Task1) has a priority of '1', cache lookup keys 'E' and 'UID1', cache types 'au', 'd', 'm', T, 'ap', and 'as', and a status of 'NA'. A second task (Task2) has a priority of '3', cache lookup keys 'E' and 'UID1', cache types 'au', 'ap', and 'as', and a status of 'NA'. A third task (Task3) has a priority of '5', cache lookup keys of 'E' and 'UID1', cache types 'd' and 'm' and a status of 'NA'. A fourth task (Task4) has a priority of '2', cache lookup keys 'E' and 'UID1', cache types 'ap', and 'as', and a status of 'NA'. A fifth task (Task5) has a priority of '4', cache lookup keys 'E' and 'UID1', cache types 'au', 'm', and 'ap', and a status of 'NA'.

With reference to FIG. 6, an exemplary cache hit test package (CHTP) 600, which is configured according to an embodiment of the present disclosure, is depicted for a second user (UID2). CHTP 600, as illustrated, includes: workloads (e.g., Task6, Task7, Task8, Task9, and Task10) for the second user (User2); a due date or priority, one or more cache lookup keys (e.g., including a language designator and a UID), one or more cache types (e.g., authorization (au), description (d), metadata (m), translated (t), application (ap), and asset (as) cache types); and a status (e.g., not assigned (NA) or assigned (A)). In CHTP 600, the cache lookup key 'F' indicates the language is French, and the cache lookup key 'UID2' indicates an identifier or username for the second user. As is illustrated, a sixth task (Task6) has a priority of '5', cache lookup keys 'F' and 'UID2', cache types 'au', 'd', 'm', T, 'ap', and 'as', and a status of 'NA'. A seventh task (Task7) has a priority of '2', cache lookup keys 'F' and 'UID2', cache types 'au', 't', and 'as', and a status of 'A', indicating the task is currently assigned. An eighth task (Task8) has a priority of '1', cache lookup keys 'F' and 'UID2', cache types 'd', 'm', and T and a status of 'A'. A ninth task (Task9) has a priority of '4', cache lookup keys 'F' and 'UID2', cache types 't', 'ap', and 'as', and a status of 'NA'. A tenth task (Task10) has a priority of '3', cache lookup keys 'F' and 'UID2', cache types 'au', 'm', and 't', and a status of 'NA'.

Figure 7:
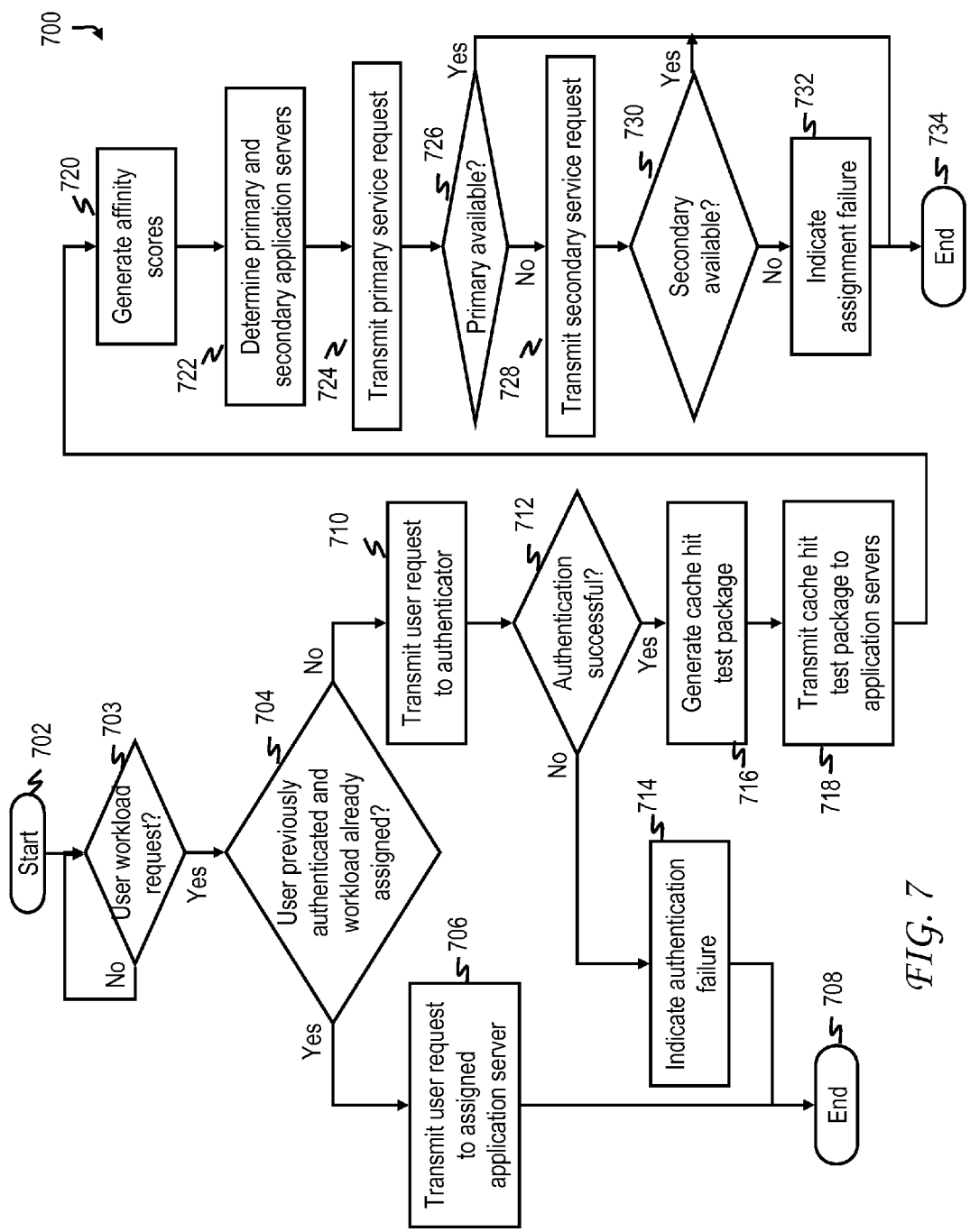
FIG. 7 is a flowchart of an exemplary process for assigning user workloads to application servers, according to an embodiment of the present disclosure.

With reference to FIG. 7 a process 700 for assigning user workloads to application servers (e.g., application servers 422, 424, 426 of FIG. 4), according to one aspect of the present disclosure, is illustrated. Process 700 may be implemented, for example, through the execution of one or more program modules 42 (see FIG. 1) of cloud control software residing in management layer 64 (see FIG. 3) by processor 16 (of computer system 12).

Process 700 may, for example, be initiated in block 702 in response to receipt of a user request (e.g., a login request) at, for example, load balancer 404 of FIG. 4. Next, in decision block 703, processor 16 determines whether the user request corresponds to a user workload request (i.e., a user request to process workloads (i.e., one or more tasks) in a user inbox). In response to the user request not corresponding to a user workload request, control loops on block 703. In response to the user request corresponding to a user workload request, control transfers from block 703 to decision block 704. In block 704, processor 16 determines whether the user (e.g., as specified by a UID provided with the user request) was previously authenticated and whether a workload associated with the user request is already assigned to an application server (e.g., one or more of application servers 422, 424, and 426). In response to the user being previously authenticated and the workload associated with the user request already being assigned to an application server, control transfers to block 706. In block 706, processor 16 transfers the user request to the assigned server. Next, in block 708, process 700 terminates until a next user request is received.

In response to the user not being previously authenticated and the workload associated with the user request not already being assigned to an application server in block 704, control transfers to block 710. In block 710, processor 16 transfers the user request (e.g., the UID associated with the user request) to authenticator 408 for authentication. Next, in decision block 712, processor 16 determines whether the authentication of the user was successful. In response to the authentication not being successful in block 712, control transfers to block 714, where processor 16 transmits an authentication failure indication to user device 402. Next, in block 708, process 700 terminates. In response to the authentication being successful in block 712, control transfers to block 716, where processor 16 generates a cache hit test package (CHTP) for the user from database 412 (or alternatively retrieves the CHTP for the user from database 412).

Next, in block 718, processor 16 transmits the CHTP to application servers 422, 424, and 426. Then, in block 720, application servers 422, 424, and 426 each generate affinity scores for the user workload based on the information in the CHTP and the extent of the information, as specified by the CHTP, that is already cached by application servers 422, 424, and 426. The affinity scores are transferred from application servers 422, 424, and 426 to affinity provider 406, which transfers the affinity scores to load balancer 404. Next, in block 722, processor 16 selects primary and secondary application servers (from among application servers 422, 424, and 426) based on the affinity scores (and possibly other distribution factors). Then, in block 724, processor 16 transmits a primary service request for the user request to the selected primary application server. Next, in decision block 726, processor 16 determines whether the selected primary server was available (e.g., based on a service response received from the primary application server).

In response to the service response indicating that the primary application server is available to service the user workload in block 726, control transfers to block 734 where process 700 terminates. In response to the service response indicating that the primary application is not available to service the user workload, control transfers from block 726 to block 728, where processor 16 transmits a secondary service request to the secondary application server. Next, in decision block 730, processor 16 determines whether the secondary application server is available to service the user workload. In response to receiving a service response (at load balancer 404) indicating that the secondary application server is available to service the user workload, control transfers from block 730 to block 734 where process 700 terminates. In response to the service response indicating that the secondary application server is not available to service the user workload, control transfers from block 730 to block 732, where processor 16 indicates an assignment failure and control then transfers to block 734. It should be appreciated that in the event that the secondary application server is not available that new primary and secondary application servers can be determined instead of terminating process 700.

Accordingly, techniques have been disclosed herein that may advantageously assign user workloads to application servers based on a current state of the application servers.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method of assigning a user workload to an application server, comprising:
  receiving, by a data processing system, a user request to initiate execution of a workload assigned to a user;
  selecting, by the data processing system an application server, from among multiple application servers, to execute the workload based on compatibility between respective current states of the application servers and the workload;
  in response to the user not being previously authenticated, transmitting the user request to an authenticator executing on the data processing system;
  attempting, by the authenticator executing on the data processing system, to authenticate the user;
  in response to the authenticator successfully authenticating the user, transmitting, by the data processing system, a cache hit test package for the user to the application servers, wherein the cache hit test package includes one or more cache lookup keys and one or more cache types that are utilized to determine the compatibility between the respective current states of the application servers and the workload; and initiate, by the data processing system, generating, by each of the application servers, respective affinity scores for the cache hit test package based on respective states of the application servers, wherein the respective affinity scores indicate the compatibility between the respective current states of the application servers and the workload.

2. The method of claim 1, wherein the user request includes a user identifier (ID) for a user.

3. The method of claim 1, further comprising:
in response to the user already being authenticated and assigned to a given one of the application servers, selecting, by the data processing system, the given one of the application servers to execute the workload.

4. The method of claim 1, further comprising:
determining a primary application server, included within the application servers, based on the affinity scores;
determining a secondary application server, included within the application servers, based on the affinity scores; and
transmitting a service request for the user request to the primary application server.

5. The method of claim 4, further comprising:
in response to the primary application server indicating that the primary application server cannot service the service request, transmitting another service request for the user request to the secondary application server.

6. The method of claim 1, wherein the one or more cache types include authorization, description, metadata, translation, application, and asset cache types.

* * * * *